(12) United States Patent
Fukumoto et al.

(10) Patent No.: US 8,868,331 B2
(45) Date of Patent: Oct. 21, 2014

(54) NAVIGATION APPARATUS (75) Inventors: Motohiro Fukumoto, Nagoya (JP); Tomoo Nomura, Nagoya (JP)

(73) Assignee: DENSO CORPORATION, Kariya (JP)

( * ) Notice: Subject to any disclaimer, the term of this patent is extended or adjusted under 35 U.S.C. 154(b) by 1987 days.

(21) Appl. No.: 11/902,383

(22) Filed: Sep. 21, 2007

(65) Prior Publication Data

US 2008/0097692 A1 Apr. 24, 2008

(30) Foreign Application Priority Data

Oct. 18, 2006 (JP) ................................ 2006-284193

(51) Int. Cl.
*G01C 21/00* (2006.01)
*G08G 1/123* (2006.01)
*G01C 21/36* (2006.01)

(52) U.S. Cl.
CPC ................................ *G01C 21/3673* (2013.01)
USPC ........................................ 701/411; 340/995.2

(58) Field of Classification Search
USPC ........... 701/200–226, 400–541; 340/288–996
See application file for complete search history.

(56) References Cited

U.S. PATENT DOCUMENTS

| 5,121,112 | A  | * | 6/1992 | Nakadozono | 340/870.16 |
| 5,430,655 | A  |   | 7/1995 | Adachi |  |
| 6,687,605 | B1 | * | 2/2004 | Wako | 701/428 |
| 7,430,473 | B2 |   | 9/2008 | Foo et al. |  |
| 2003/0050756 | A1 | * | 3/2003 | McGovern | 701/211 |
| 2005/0007953 | A1 | * | 1/2005 | Hirose et al. | 370/229 |
| 2006/0135198 | A1 | * | 6/2006 | Lee | 455/550.1 |

FOREIGN PATENT DOCUMENTS

| JP | A-05-010775 | 1/1993 |
| JP | A-8-210869 | 8/1996 |
| JP | A-09-096540 | 4/1997 |

OTHER PUBLICATIONS

Office Action dated Jul. 6, 2010 in corresponding JP Application No. 2006-284193 (and English translation).

* cited by examiner

*Primary Examiner* — Muhammad Shafi
(74) *Attorney, Agent, or Firm* — Posz Law Group, PLC (57) ABSTRACT

A navigation apparatus in a vehicle displays road names of cross roads that crosses a to-be-traveled road along the to-be-traveled road at positions that area adjacent to respective cross roads. In this manner, a user of the navigation apparatus easily recognizes the road names of the roads to be traveled by the vehicle in his/her view.

8 Claims, 5 Drawing Sheets

LINK ROW DATA A

| SHAPE INFO. | | LINK 1 |
| --- | --- | --- |
| LINK ID INFO. | | LINK 2 |
| ROAD NAME ADDR. | | ⋮ |
| WIDTH & LANE INFO. | | |
| ⋮ | | |

FIG. 2C

| ADDR 1 | AAA ST |
| --- | --- |
| ADDR 2 | BBB ST |
| ⋮ | ⋮ |

NAVIGATION APPARATUS

CROSSREFERENCE TO RELATED APPLICATION

This application is based on and claims the benefit of priority of Japanese Patent Application No. 2006-284193 filed on Oct. 18, 2006, the disclosure of which is incorporated herein by reference.

FIELD OF THE DISCLOSURE

The present disclosure generally relates to a navigation apparatus for use in a vehicle.

BACKGROUND INFORMATION

A conventional navigation apparatus on a vehicle displays a wide variety of facility names such as parks together with road names and the like besides address names (an administrative section name) such as prefecture names, city/town/village names and the like on a roadmap. In this manner, a user can obtain information to identify a nearby facility, each of the roads as well as an area where the vehicle is located. However, a display position of those names is predetermined in the roadmap data, and thus each of those names is displayed at a predetermined display position.

For a user operating a vehicle, an address name and a facility name are the information which is necessary for, for example, knowing the location which the vehicle currently is traveling. However, when the user operates the vehicle, an approximate path to reach to a desired destination is determined, and the vehicle most likely travels along the approximate path under control of the user. In this case, each of the road names rather than an address name and a facility name are treated as more important information. This is because the user usually determines which of many roads should be taken for traveling along the predetermined approximate path based primarily on the road names.

However, the user does not have to grasp all of the road names displayed on the navigation apparatus. That is, the user can travel along the predetermined approximate path to the destination when he/she can at least determine which road should the vehicle go into after passing a currently traveling road.

SUMMARY OF THE DISCLOSURE

In view of the above and other problems, the present disclosure provides a navigation apparatus for use in a vehicle that is capable of displaying road names in a recognizable manner for the ease of navigation route determination by a user of the navigation apparatus.

To achieve an above objective, the navigation apparatus includes: a display unit; a detection unit that detects a current vehicle position and a traveling direction of a vehicle; a storage that stores roadmap data for displaying a roadmap together with each of road names; and a display control unit that controls the display unit for displaying the roadmap with a vehicle icon that represents the current vehicle position and the travel direction of the vehicle based on the current vehicle position. The display control unit controls the display unit to display a portion of the roadmap that includes a proximity of the current vehicle position. Further, the display control unit controls the display unit to display a road name of a cross road that crosses a to-be-traveled road by the vehicle at a position adjacent to the cross road along the to-be-traveled road.

When the user determines a road which should be traveled by the vehicle, the user is obliged to select one road from among the roads that are connected either to the road that is currently being traveled by the vehicle or to the road that is to-be-traveled by the vehicle subsequently after the currently-being-traveled road. Therefore, the navigation apparatus of the present disclosure displays the road name of the cross road that crosses the to-be-traveled road at a position adjacent to the cross road along the to-be-traveled road. In this manner, the user recognizes the road name of the road that can be traveled by the vehicle easily. As a result, the user can correctly determine the road to be traveled with ease based on the recognized road name.

BRIEF DESCRIPTION OF THE DRAWINGS

Other objects, features and advantages of the present invention will become more apparent from the following detailed description made with reference to the accompanying drawings, in which.

DETAILED DESCRIPTION

Embodiments of the present disclosure are described with reference to the accompanying drawings.

Figure 1:
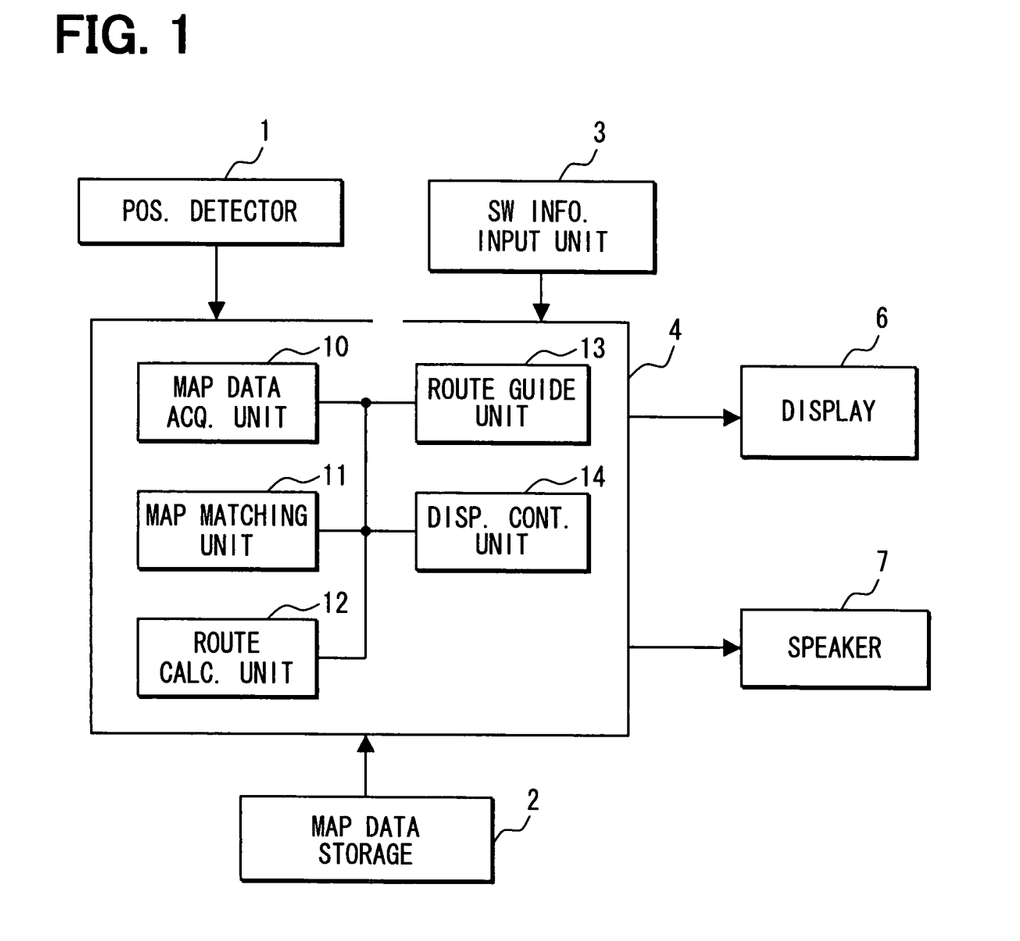
FIG. 1 shows a block diagram of a navigation system in an embodiment of the present disclosure.

FIG. 1 is a block diagram showing outline constitution of a navigation apparatus for use in a vehicle in the present embodiment. The navigation apparatus of this embodiment possesses a position detector 1, a map data storage 2, a switch information input unit 3, a control unit 4 that is connected to the above parts, and a display 6 as well as a voice output unit (a speaker) 7 connected to the control unit 4.

The position detector 1 is composed of a geo-magnetic sensor, a gyro sensor, a speed sensor, a global positioning system (GPS) sensor that utilizes a radio wave from a satellite of well-known kind and other parts. Due to the errors of different nature from respective components, these sensors are configured to compensate with each other. In addition, when the accuracy of respective sensors varies, it may be possible to compose the position detector 1 with some of the above sensors.

The map data storage 2 is used to input to the control unit 4 roadmap data to draw roadmaps from data such as road data or background data. The map data storage 2 possesses storage medium to store roadmap data, and, as for such storage medium, a DVD-ROM or hard disk are used due to an amount of the data. The storage medium of another kind may be used instead. Further, the map data stored in an external server may be acquired by the map data storage 2 that servers as a communication device for an external communication.

The switch information input unit 3 is used for a wide variety of input. For example, the switch information input unit 3 is composed of mechanical switches installed around the display 6, and a touch switch united with the display 6 for input operation. Thus, for example, when a so-called course guidance function is provided in the navigation apparatus in the present embodiment, an input of a destination from the switch information input unit 3 causes a calculation of an optimal path (i.e., a navigation route) to the destination from a current position as a start point, and leads to a guidance from the speaker 7 and the display 6 based on the navigation route.

The display 6 consists of, for example, a liquid crystal display unit. The display 6 has a screen that displays on the roadmap a vehicle icon that represents a current position and traveling direction of the vehicle based on the current position of the vehicle detected by the position detector 1 and the roadmap data from the map data storage 2. The screen of the display 6 also displays selection box for destination selection, configuration setting box for setting ON/OFF of various navigation functions and the like.

The speaker 7 constitutes the voice output unit that is used for outputting a voice for providing a route guidance and for explaining an operation of the navigation apparatus.

The control unit 4 consists of components of a normal computer, and includes a central processing unit (CPU), a ROM, a RAM, an input/output (I/O) circuit, and a bus line connecting therebetween. These components are well-known type. A program to be carried out by the in-vehicle navigation apparatus is written in the ROM, and the CPU executes a predetermined arithmetic processing according to the program. In addition, as shown in FIG. 1, the main function to be carried out by the control unit 4 is presented as a block diagram. That is, the control unit 4 equips a map data acquisition unit 10, a map matching unit 11, a route calculation unit 12, a route guide unit 13 and a display control unit 14.

The map data acquisition unit 10 acquires the roadmap data of an area that surrounds and includes the current vehicle position detected by the position detector 1 from the map data storage 2, and then sends the acquired data to the display control unit 14. The display control unit 14 draws, based on the roadmap data acquired from the map data storage 2, a roadmap in a VRAM (not illustrated), and sends a display signal to the display 6 for displaying the roadmap around the current vehicle position with the vehicle icon that represents the current position and the travel direction of the vehicle superposed thereon.

When the vehicle travels along, a trace of the travel is stored in the map matching unit 11. The map matching unit 11 matches a shape of the travel of the vehicle and a shape of the road. When it is determined, based on the map matching, that the current vehicle position on the display 6 does not accurately reflects an actual vehicle position, the map matching unit 11 sends a correct vehicle position to the display control unit 14. In this manner, the display control unit 14 revises a vehicle position to be displayed on the display 6.

In addition, the route calculation unit 12 calculates an optimal navigation route from a current vehicle position to a destination when the destination is input from the switch information input unit 3. At this stage, the map data acquisition unit 10 reads the roadmap data between the current vehicle position and the destination from the map data storage 2, and the route calculation unit 12 applies technique such as well-known Dijkstra method or the like to the data for calculating an optimal navigation route. The calculated navigation route is sent to the route guide unit 13. The route guide unit 13 instructs the display control unit 14 to draw roads that correspond to the calculated navigation route by using a predetermined color for easy recognition in the roadmap displayed in the display 6. Further, a guidance point for the crossings at which the vehicle should make a right/left turn is calculated, and a voice/sound signal is output to the speaker 7 for notifying the user of the right/left turn at the guidance point. Furthermore, information on the guidance point is sent to the display control unit 14, and the display control unit 14 generates a display signal for displaying on the display 6 an expanded view of the crossings with its proximity and an illustration of an expressway.

Detailed explanations of the roadmap display process and road name display position control process in the roadmap display are provided in the following.

Figure 2A:
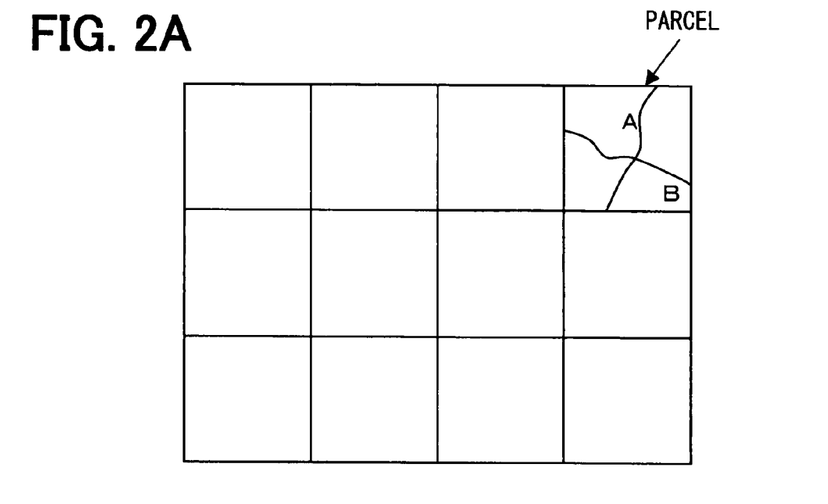
FIGS. 2A to 2C show illustrative diagrams of roadmap data structure.
Figure 2B:
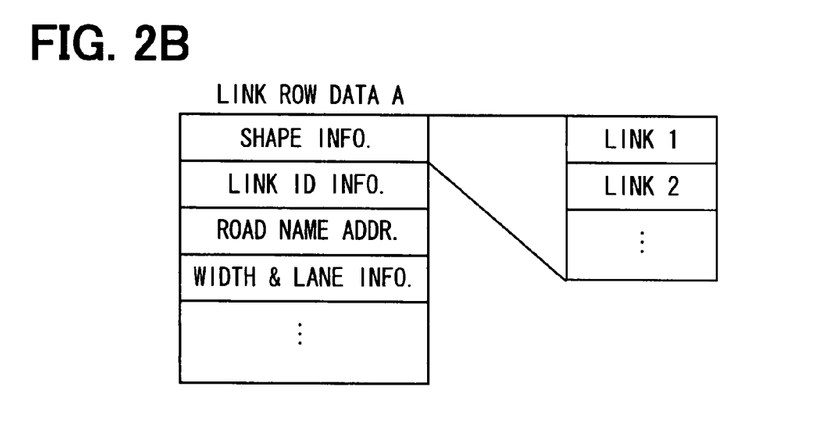
Figure 2C:
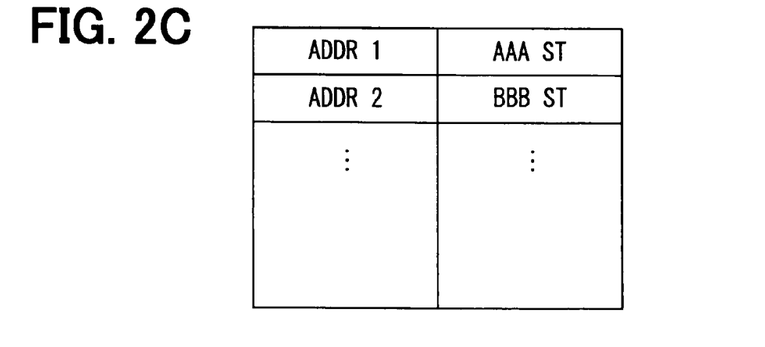

First, FIGS. 2A, 2B, 2C are referred to for the explanation. The display area of the roadmap is divided into the shape of mesh, and the roadmap data is stored to the map data storage 2 by the unit of a parcel (i.e., a division of a map) as shown in FIG. 2A. In this way, the roadmap data which is stored in a divided manner as a unit of the parcel mainly consists of background data for displaying the land shape (i.e., geographical features), railroad tracks and the like, and road data for displaying road image that corresponds to actual roads.

Road data has link row data to show shapes, widths, the number of lanes of a road and the like for all the roads in one parcel. In this case, each of the roads is represented by defining the nodes and the links. That is, the nodes are defined feature points for representing a divergence, a crossing, a connection of two or more roads, and the links are defined feature elements for connecting two nodes. When the actual road takes a shape that is different from a straight line, a form interpolation point is set between the nodes so that a shape of the displayed road simulates a shape of an actual road. In this case, a line for connecting the nodes and/or the form interpolation points is defined as a segment, and a link is constituted of plural segments.

The link row data includes data of plural links that represent portions of an actual road having the same name or same travel conditions.

For example, when a road A and a road B are supposed to be included in one parcel as shown in FIG. 2A, the road data of this parcel has a link row data B corresponding to the road B as well as a link row data A corresponding to the road A.

Examples of the link row data A, B are shown in FIG. 2B. The link row data A includes information such as shape information for representing a shape of each link, link ID information for uniquely identifying each link, road name address for indicating a storage area of a road name of the road A that corresponds to the link row data A, width/lane information for specifying the width and the number of lanes of the road A and the like. In addition, the shape information of each link is constituted of coordinate strings that specifies the coordinates of the nodes on both ends and the form interpolation points between the both ends.

The link row data includes, as described above, the road name address for indicating the storage area of the road name, and the road name address enables the retrieval of the road names from the storage area. The road name is stored in a sequential order in the storage area corresponding to the road name address of each of the link row data as shown in FIG. 2C.

Figure 3:
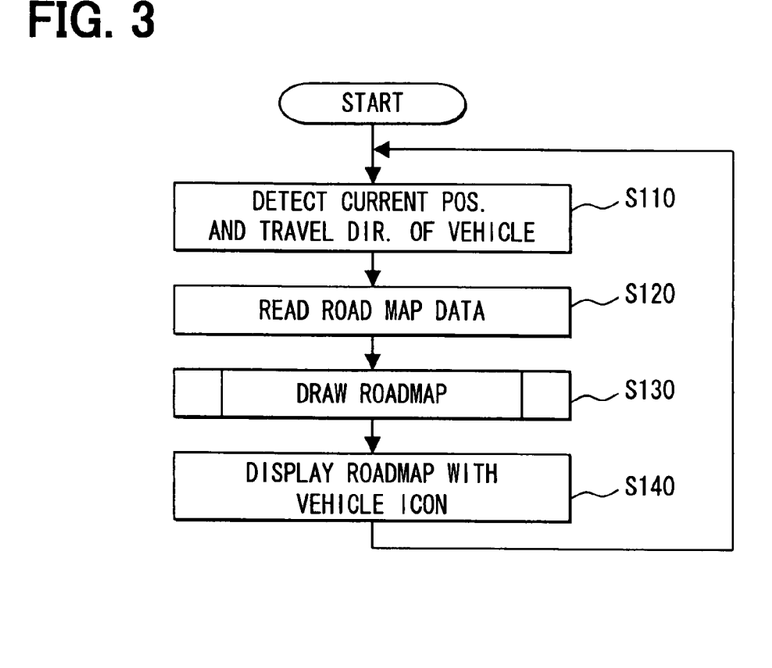
FIG. 3 shows a flowchart of a process for displaying a vehicle icon that indicates a current vehicle position and a travel direction on a roadmap.

Then, a process for displaying a roadmap with the vehicle icon showing the current vehicle position and the travel direction based on the roadmap data is described with reference to a flowchart in FIG. 3.

First, in step S110, based on a detection result by the position detector 1, a current position of the vehicle and a travel direction are detected. Then, in step S120, based on the current position detected in step S110, the roadmap data for drawing a roadmap of a nearby area is read out from the map data storage 2 by a unit of a parcel. Then, based on the retrieved roadmap data in step S130, the roadmap is drawn in the VRAM in the display control unit 14. The drawing process of this roadmap will be described later in detail.

In addition, the VRAM in the display control unit 14 possesses the capacity which can accommodate an area of the roadmap which is larger than a display range of the display 6 so that the roadmap can be scrolled as the vehicle travels. Then, in step S140, the display control unit 14 sets the display range of the roadmap so that the vehicle icon is always displayed at a constant position and the travel direction of the vehicle always points upward in the screen, and generates a display signal for displaying the above specified area of the roadmap on the display 6. However, the display control unit 14 may be configured to display the roadmap in a manner that a certain direction (e.g., true north) always points upward.

Figure 4:
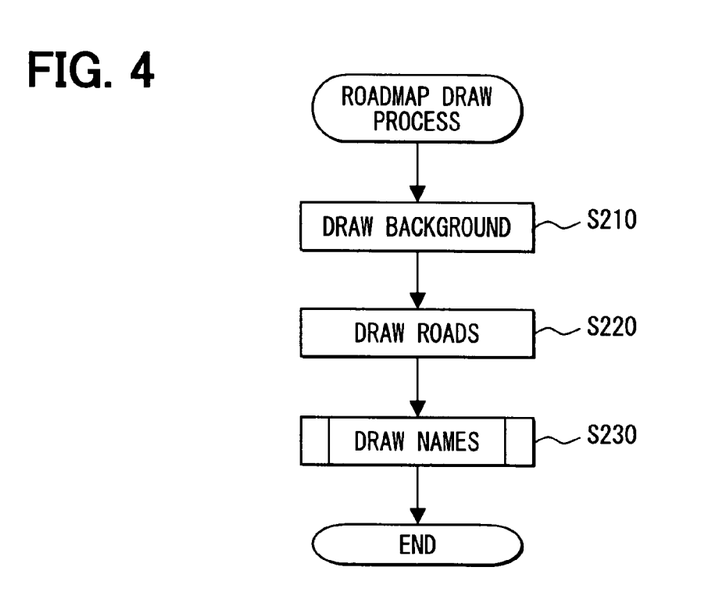
FIG. 4 shows a flowchart of a roadmap draw process.

Then, a flowchart in FIG. 4 is used for describing a drawing process of a roadmap. In this case, the VRAM of the display control unit 14 has drawing panes respectively dedicated for drawing backgrounds, road shapes and road names, and respective drawing data in each of the drawing panes are superposed with each other for generating a display signal to be sent to the display 6.

First, in step S210, based on the retrieved background data of the roadmap data, a background of the roadmap is drawn in a drawing pane for the background. Then, in step S220, based on the retrieved shape information in the road data of the roadmap data, each of the road is drawn in a drawing pane for the road. Further, in step S230, based on the road name address in the link row data of the road data, the road name to be displayed is read out, and a display position of each of the road names is determined by a process described later. In this manner, each of the road names is drawn at the determined display position.

In this case, once the roadmap is drawn once in the VRAM, the roadmap drawn in the VRAM is maintained until the vehicle comes close to the periphery of the drawn area. When the vehicle comes close to the periphery of the drawn area, a roadmap that extends from the edge of the drawn area is newly drawn, and the roadmap that is no longer used is erased from the VRAM.

Figure 5:
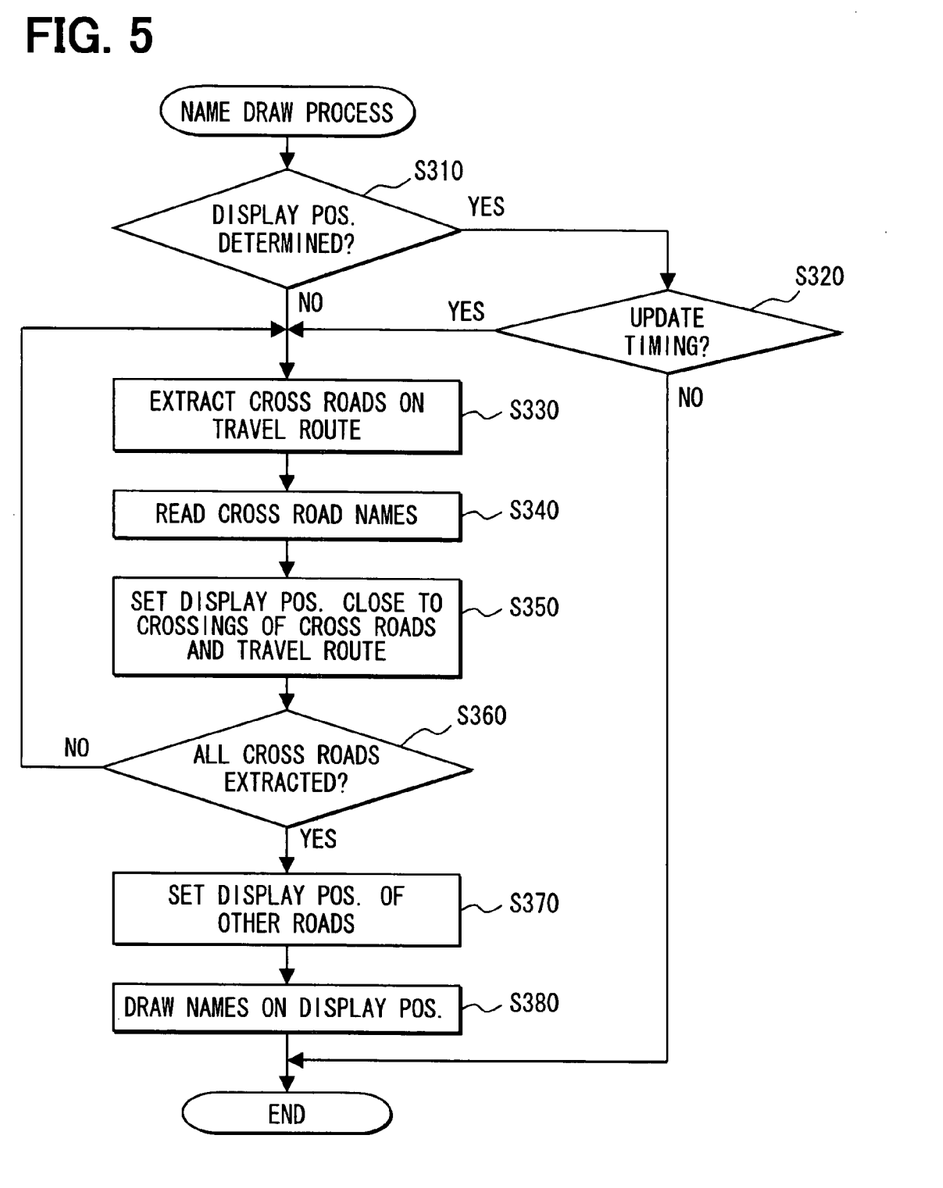
FIG. 5 shows a flowchart of a name draw process.

A process determining a display position of each of the road names (a name draw process) is explained in the following with reference to a flowchart in FIG. 5. First, in step S310, whether a display position of each road name is determined is determined, and whether each road name is already drawn in the drawing pane for the road names is also determined. When it is determined that the above criteria are affirmatively met as "Yes" in the processing, the process proceeds to step S320.

In step S320, it is determined whether an update timing for updating the road name display is coming. Whether it is the update timing or not is determined based on various conditions, such as a condition that the travel direction of the vehicle changes by a predetermined angle (e.g., 45 degrees or more) as the vehicle travels along. In other words, the roadmap display angle has to be changed by 45 degrees or more. It is also determined as the update timing when the road being traveled by the vehicle is changed, or when the navigation route is changed. In step S320, when it is determined that the update timing is not coming (step S320:NO), the process of the flowchart in FIG. 5 concludes itself. On the other hand, when it is determined that the update timing is coming in step S320, or when it is determined that the road name display position has not been determined in step S310, the process proceeds to step S330.

In step S330, the process extracts the cross roads that cross the to-be-traveled road. In this case, the navigation route being provided as guidance is considered as the to-be-traveled road by the vehicle when the navigation route is being calculated and provided, and when the navigation route is not being provided, the currently traveled road is considered as the to-be-traveled road. More practically, based on the link row data, the link row data including a link that has the same node as the node on the link that constitutes the to-be-traveled road. In this case, however, the road which can not be directly entered from the to-be-traveled road due to the grade separation structure is excluded from the extraction candidates.

In step S340, the road names of the cross roads are read out based on the road name addresses of the extracted cross roads in the link row data. Then, a display position of each of the road names is determined in the vicinity of a crossing between the cross road and the to-be-traveled road along the cross road to an extent that does not overlap the to-be-traveled road in step S350.

Figure 6A:
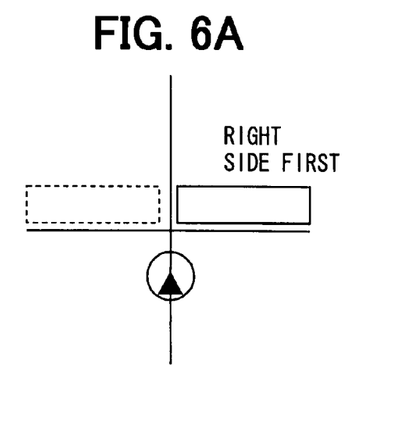
FIGS. 6A and 6B show illustrations of road name display position determination rules for cross roads.

In the course of display position determination, a certain rule is established beforehand, and the display position is determined according to the rule. For example, a display position on the right side of the travel direction is preceded when both sides (a right and left side) of the to-be-traveled road have the road having the same name as shown in FIG. 6A. However, a display position is set to the left side of the travel direction when a high-priority road name or the like relative to the road name of the cross road is displayed on the right side.

Figure 6B:
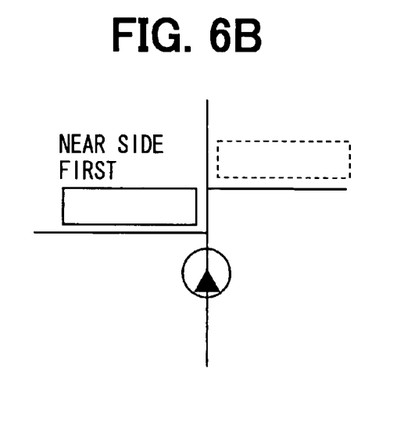

Further, when the cross road intersect with the to-be-traveled road at different points for the right side and the left side, that is, when a connection point of the right side cross road and a connection point of the left side cross road are positioned at two different points on the to-be-traveled road, the near one of the two connection points is chosen as the prioritized display position as shown in FIG. 6B.

In this manner, if a display position is determined according to a certain rule, it is easy for a user to read and understand the road name on the roadmap. Further, though the user generally feels easy in terms of reading the road names when the road names are displayed as level as possible, the road names of the cross road are displayed in a manner that prioritizes the nearness of the display position of the road name to the to-be-traveled road. As a result, the display angles of the road names of the cross roads will be following the extending directions of the cross roads. In the present embodiment, the scheme of displaying the road names prioritizes the recognizable characteristics of the cross road names at a glance by concentrating the road names around the to-be-traveled road than the readability of the road names by the adjustment of the display angle.

In addition, the extraction of the cross roads may preferably performed from the near side to the vehicle in a sequential order in step S330. In this manner, the road name display of the cross roads on the near side to the vehicle is preceded. In other words, in the present embodiment, the priority of road name display is assigned to the road name on a first-come first-served basis, and other names are prohibited to be positioned on top of an already positioned name. As a result, a name with its display position name determined earlier has a higher display position priority.

In step S360, after all of the cross roads to cross the to-be-traveled road are extracted from the retrieved road data, whether the road name display positions of the all cross roads are determined is determined. When it is determined that there are the cross roads which are not yet extracted, the process returns to step S330, and determines the display positions of the road names.

In step S370, road names of the roads that do not cross the to-be-traveled road are extracted and positioned in the roadmap (i.e., display positions of the no-crossing road names are determined). Display position determination rules for the no-crossing road are exemplified and illustrated in FIG. 7. An example of displaying a road name "○○○ ST" along a corresponding road is shown in FIG. 7.

First, display position candidates are selected based on a criteria that the display position candidates at least have a substantially straight portion with a length that corresponds to the display length of the subject road name in order to display the road name "○○○ ST" along the subject road.

Among the display position candidates, the candidate that allows the most level display of the road name is chosen as the display position.

Figure 7:
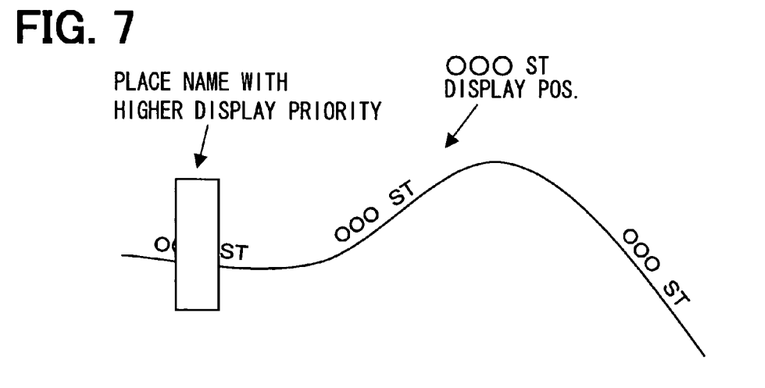
FIG. 7 shows an illustration of road name display position determination rules for roads other than cross roads.

However, when the most level display position of the road name makes the display of the road name overlap another high display priority name, the display position of subsequent levelness is chosen as shown in FIG. 7. At any position of the display position candidates, the road name of the lower display position priority that overlaps the other high display priority name is prevented from being displayed.

This is because both names can not be recognizable when displayed in an overlapping manner.

In this manner, after determining the display positions of the road names of the cross roads that cross the to-be-traveled road and other roads, the process proceeds to step S380. In step S380, each of the road names is drawn at the determined display position.

Figure 8:
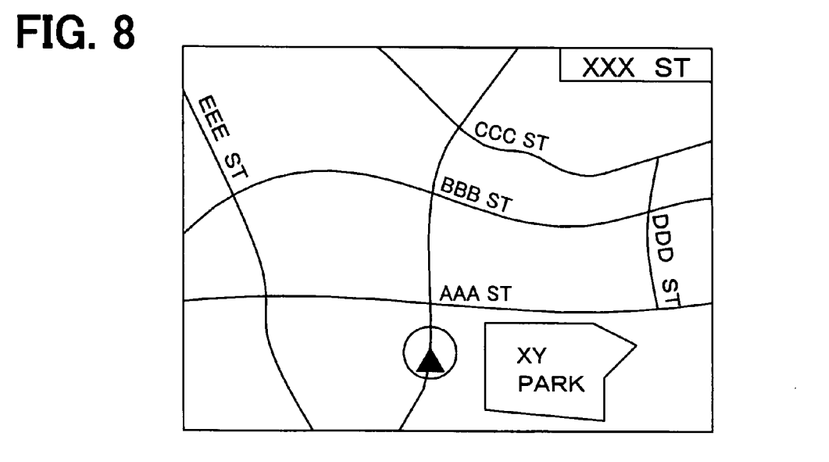
FIG. 8 shows an illustration of roadmap display by the navigation system in the embodiment of the present disclosure.

As described above, the road names are drawn in the drawing pane for the road names as the display positions of the road names are determined, and as a result, the roadmap as shown in FIG. 8 is displayed on the display 6.

In the roadmap shown in FIG. 8, the road names of the to-be-traveled road and the cross roads are displayed along the to-be-traveled road at its proximity.

Therefore, the user can easily recognize the road names of the roads that are travelable in a subsequent travel.

As a result, by using the road names as a clue, the travel direction and the road to be traveled are easily and correctly determined by the user.

In addition, the road name of the road being currently traveled is displayed at a position such as an upper right corner of the screen or the like, and is not displayed at the position along the road being currently traveled.

Although the present invention has been fully described in connection with the preferred embodiment thereof with reference to the accompanying drawings, it is to be noted that various changes and modifications will become apparent to those skilled in the art.

For example, in the above embodiment, a display of the road names of cross roads is preceded than a display of the road names of the other roads (i.e., no-crossing roads) against the to-be-traveled road by having all the roads in the roadmap as the subject road (i.e., as candidate roads).

However, roadmaps generally have address names and/or facility names as a display besides the road names.

Therefore, display priority may be given to the address names and the facility names for determining display positions.

In this case, the display priority of the cross roads may be ranked as highest, and the display priority of the address/facility names may be ranked lower than the cross road names, and may be ranked higher than the road names of no-crossing roads.

In this manner, as described above, the display positions of the road names of the cross roads is prioritized to be closed to the to-be-traveled road at the proximity of the respective cross roads. Then, the address/facility names are positioned not to be overlapping with the cross road names. Therefore, the address/facility name positions are determined under relatively loose restrictions, thereby making it possible to display the address/facility names at appropriate positions. Lastly, display positions of the road names of the no-crossing roads are determined not to be overlapping with the other names (i.e., the cross road names, the address names, and the facility names).

The address names and the facility names are sometimes utilized for recognizing the area where the vehicle is traveling or for confirming a final destination of the travel. By assigning the display position priority that is higher than the cross roads and lower than the no-crossing roads to the address/facility names, the address names and the facility names are displayed at generally appropriate positions as described above.

Further, road number of especially important roads may be included in the priority system for displaying the road number in an area that is centered around the important roads. However, in this case, the road number of the important roads may have higher priority than the display position of the cross roads due to its importance as the national roads or the like.

Furthermore, though display positions of the road name of no-crossing roads are also determined as one of the no-crossing road approaches in the embodiment described above, only the road names of the cross roads may be configured to be displayed closely to the to-be-traveled road with other road names displayed at predetermined positions as the conventional roadmaps. When the other road names overlap with the other names of higher priority, the display of the other names may be omitted. In this manner, the process load for drawing the names on the roadmap is lightened.

Furthermore, the priority system may be extended among the no-crossing roads. That is, for example, the roads may be classified according to the number of lanes, road classes and other characteristics, and the display positions of the road names of more significant roads may be determined prior to the display positions of the road names of other roads.

Such changes and modifications are to be understood as being within the scope of the present invention as defined by the appended claims.

What is claimed is:

1. A navigation apparatus comprising:
    a display unit,
    a detection unit that detects a current vehicle position and a traveling direction of a vehicle;
    a storage that stores roadmap data for displaying a roadmap together with each of road names; and
    a display control unit that controls the display unit for displaying the roadmap with a vehicle icon that represents the current vehicle position and the travel direction of the vehicle by reading roadmap data from the storage based on the current vehicle position,
    wherein
    the display control unit controls the display unit to display a portion of the roadmap that includes a proximity of the current vehicle position,
    the display control unit controls the display unit to display a road name of a cross road that crosses a to-be-traveled road by the vehicle at a position adjacent to the cross road along the to-be-traveled road, the display control unit displays the road name of each of roads that are included in the roadmap to be displayed on the display unit, the display control unit prioritizes a display of the road names of the cross roads by determining display positions of the road names of other roads in a manner that does not interfere with the prioritized road names of the cross roads, the roadmap data stored in the storage includes address names and facility names, the display control unit displays the address names and the facility names in an area of the roadmap to be displayed in a same window as the roadmap on the display unit, a priority of displaying the address names and the facility names is configured to be lower than a priority of the displaying the road names of the cross roads, and the priority of displaying the address names and the facility names is configured to be higher than a priority of the displaying the road names of the other roads.

2. The navigation apparatus of claim 1, wherein, when the display control unit displays the road name of the cross road that crosses the to-be-traveled road adjacent to the cross road, the display control unit displays the road name of the cross road at a position adjacent to the cross road to an extent that does not cause interference with the to-be-traveled road.

3. The navigation apparatus of claim 1 further comprising:

a route guide unit that sets a guide route toward a destination and provides a route guide to guide the vehicle along the guide route upon having the destination, wherein, when the route guide is provided by the route guide unit, the display control unit considers the guide route as the to-be-traveled road by the vehicle.

4. The navigation apparatus of claim 3, wherein, when the route guide is not provided by the route guide unit, the display control unit considers a subsequent road of a currently traveled road as the to-be-traveled road by the vehicle.

5. The navigation apparatus of claim 1, wherein the display control unit does not display the road name of a grade separation road that crosses the to-be-traveled road without interconnection at a position adjacent to the grade separation road.

6. The navigation apparatus of claim 1, wherein, when displaying the names of lower display priority interferes with displaying of the names of higher display priority, the display control unit omit displaying of the names of the lower display priority.

7. The navigation apparatus of claim 1, wherein the cross roads that crosses the to-be-traveled road includes a right side road that exists on a right side of the to-be-traveled road with a connection point to the to-be-traveled road and a left side road that exists on a left side of the to-be-traveled road with a different connection point to the to-be-traveled road relative to the right side road, and when both of the right side road and the left side road have a same road name, one of the two same road names is displayed with the other name being omitted from displaying.

8. The navigation apparatus of claim 7, wherein one of the two same road names of the right side and left side roads that is on a near side relative to the vehicle is displayed, and the other of the two same road names of the right side and left side roads that is on a far side relative to the vehicle is not displayed.

* * * * *